Aug. 20, 1940. M. WITTMANN Re. 21,539
DOLL
Original Filed Dec. 8, 1934
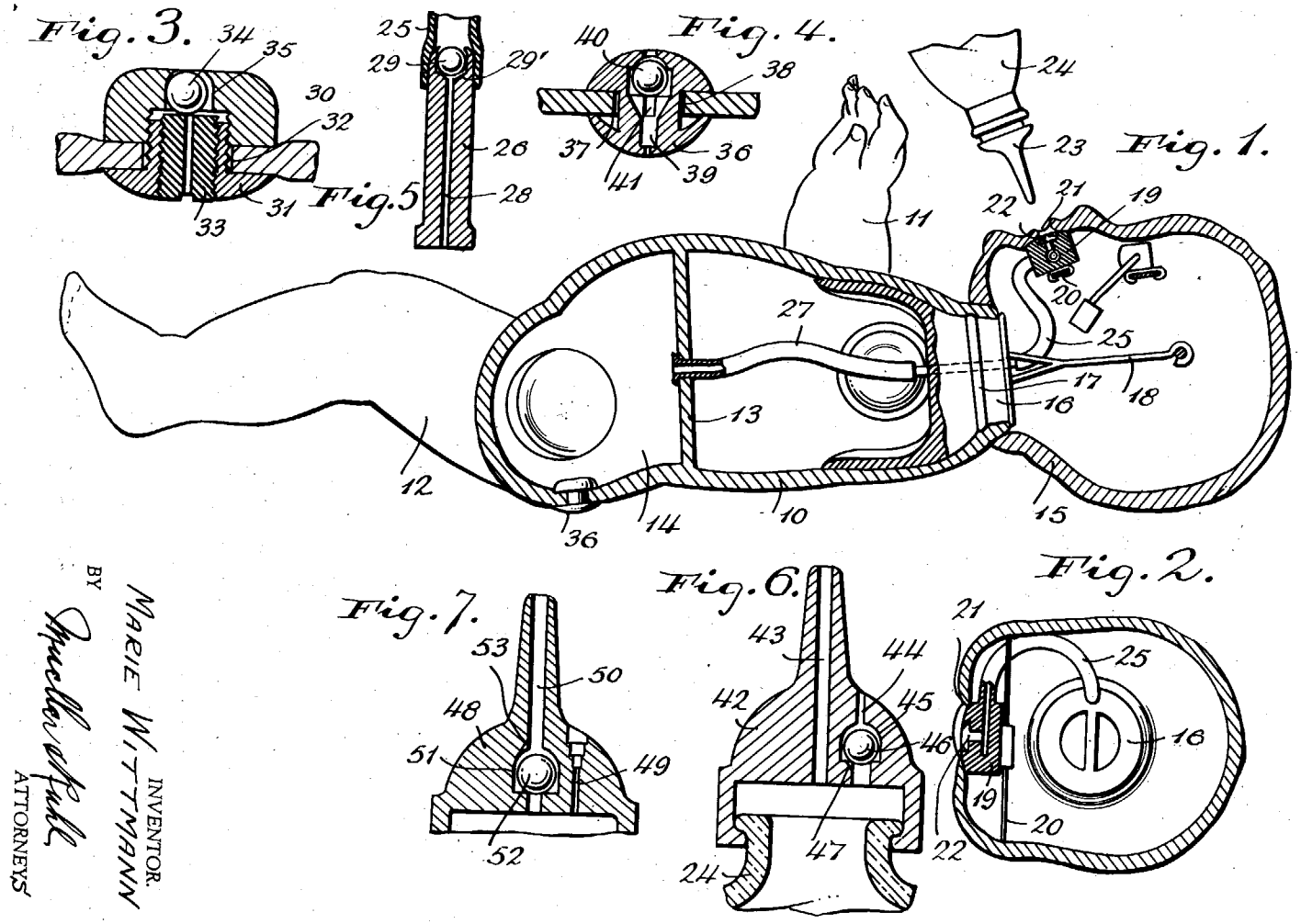
INVENTOR.
MARIE WITTMANN
BY
Mueller & Kuhl
ATTORNEYS Reissued Aug. 20, 1940 Re. 21,539

UNITED STATES PATENT OFFICE 21,539

DOLL

Marie Wittmann, New York, N. Y.

Original No. 2,012,060, dated August 20, 1935, Serial No. 756,613, December 8, 1934. Application for reissue November 15, 1935, Serial No. 50,044

15 Claims. (Cl. 46—141)

This invention relates to improvements in dolls, the subject matter herein-disclosed being a continuation in part of my co-pending application, Serial Number 658,473, filed February 25, 1933 (now matured into Patent No. 2,007,784, granted July 9, 1935).

An object of the invention is to provide a doll of simple and practical construction wherein the hollow body thereof is made compressible to control the ingress of a liquid into the same from a nursing bottle and an outlet provided in said body to permit of the slow egress of said liquid into a cloth or diaper, to thereby simulate human functions.

The above and other objects will appear more clearly from the following detailed description, when taken in connection with the accompanying drawing which illustrates preferred embodiments of the inventive idea.

In the drawing:

Figure 1 is a longitudinal section through the doll constructed in accordance with the invention.

Figure 2 is a horizontal section through the doll's head.

Figure 3 is an enlarged sectional view through an outlet valve in the doll body.

Figure 4 is a similar view of another form of outlet valve.

Figure 5 is a longitudinal section through an inlet valve which controls the flow of a liquid into the doll body, and Figures 6 and 7 are sectional views of different forms of nipples to be used on a nursing bottle and which cooperate with the valve of Figure 5 in controlling the flow of liquid into the doll body.

The doll illustrated in Figure 1 comprises a body 10, arms 11, and legs 12 all of which are hollow and preferably made of rubber, the connections of the limbs to the body, fully described and claimed in the above-identified application, rendering the parts air and liquid tight. The body 10 is adapted to be compressed and then allowed to expand so as to create a suction therein which will be sufficient to draw a liquid from a nursing bottle into the body. As shown in Figure 1, the interior of the body is provided with a partition 13 which forms a liquid receiving compartment 14 in the lower portion of said body. The head 15 of the doll may be made of any suitable material and is provided with an opening for receiving the neck portion of the body 10. The latter is closed at its neck end by a neckpiece 16 which may be also made of rubber and which snugly fits within said neck portion so as to constitute a partition between the interior of the body and the head of the doll. The exterior surface of the neckpiece 16 is provided with circumferential beads 17 over which fits the rubber neck portion of the body, thereby assisting in holding said piece in position and further rendering the body liquid tight. To attach the head 15 to the body 10 there is provided a connecting member 18 one end of which is secured to the head while the other end is joined to the neck-piece 16.

The mechanism which enables the doll to simulate the human function of drinking from a nursing bottle, comprises a mouth-piece 19 of rubber suitably mounted within the head 15 by means of a strip 20 having its ends embedded in the sides of said head so as to properly position said mouth-piece contiguous to the mouth opening 21. The mouth-piece 19 is provided with an opening 22 adapted to receive the end of the nipple 23 mounted in the neck of the nursing bottle 24, and said opening communicates with one end of a flexible tubing 25 the other end of which is fitted over a valve body 26 mounted in a suitable opening formed in the neck-piece 16 to one side thereof. To the inner end of the valve body 26 is joined one end of a flexible tubing 27 the other end of which is extended through the partition 13 so as to communicate with the compartment 14. The valve body 26 has a longitudinal duct 28 extending therethrough and the flow of liquid through said duct is controlled by a ball valve 29 in the end of the body 26 adjacent the tubing 25. The valve 29 is retained in the valve body by crimping the latter and said valve has a slight movement in the recess thus formed for it but never acts to fully close the duct 28 in any position of the valve, the crimped portion of the valve body merely acting to retain the valve therein, and not forming a seat for the latter which would be entirely closed when said valve is forced outwardly toward said crimped portion by the exhaust of air from the compartment 14 as the doll body is being compressed. When resting upon its seat, said valve only partially closes the duct 28 due to a small notch 29' formed in said seat, thus permitting a slow flow of liquid from the bottle 24 into the tubing 27 when suction is created within the body by its expansion, after compression. As air is expelled from the body through the duct 28 and past the valve 29 during compression of the compartment 14, the valve 29 is raised off its seat by the pressure of said air which is then allowed to escape through the mouth-piece 19.

An outlet is provided in the lower back portion of the body 10 which communicates with the compartment 14 that receives liquid from the tubing 27, and said outlet permits the slow escape of the liquid from said compartment into a diaper or cloth (not shown) upon completion of the expansion of said compartment and resulting cessation of the suction which draws liquid into the compartment from the bottle 24. In Figure 3, the structure of said outlet is shown as comprising internally and externally screw threaded members 30 and 31 disposed, respectively, on the inner and outer sides of the body which is clamped therebetween the shank of the member 31 extending through an opening 32 formed in the wall of said body. In the member 31 there is threaded an apertured valve seat 33, the opening therein being controlled by a small ball valve 34 disposed within a cavity 35 and adapted to only partially close said opening in the seat 33 so as to permit of the slow egress of the liquid from the compartment 14. When the body 10 is expanding after being compressed, and the suction created by this operation is having the desired effect of drawing liquid into the body from the nursing bottle 24, the ball valve 34 is drawn inwardly, by said suction, and tightly against the inner end of the cavity 35 so that air will not enter the body during the suction operation. As soon, however, as the suction ceases, the valve 34 assumes the position shown in the drawing and thus allows the liquid now in the compartment 14 to flow slowly through the opening in the seat 33. This flow of the liquid may be controlled to some extent by adjusting the seat 33 in the member 31. When in the last-named position, the valve 34 also permits a slight amount of air to escape from the compartment 14, in addition to that exhausting past the valve 29, when said compartment is being compressed.

The valve structure of Figure 4 accomplishes the same function as that of Figure 3 and comprises a body 36 made of rubber and provided with a circumferential groove 37 which receives the portion of the wall of the body 10 surrounding the opening 38 therein so that sections of the valve body 36 will be disposed on opposite sides of said wall and snugly engage the same to prevent leakage from the compartment 14, except through the opening or passage 39 in said body 36. Again, a ball valve 40 within said passage and engageable with a seat 41 therein, controls the slow egress of liquid from the doll body and prevents air entering the latter during suction by being drawn against the inner end of the passage 39. When said suction ceases the valve 40 falls by gravity against the seat 41 but does not entirely close the passage in this position so that the liquid from the compartment will flow slowly therefrom.

Figure 6 illustrates a form of nipple which may be used on the nursing bottle and is shown as comprising a body portion 42, preferably of rubber adapted to fit over the neck of said bottle and provided with a central liquid passage 43 extending therethrough. Offset from said passage, the body 42 is also provided with an air vent or passage 44 enlarged at its intermediate portion to form a chamber 45 in which a valve 46 has a limited movement. When in the position shown in Figure 6, the valve is seated against the inner end of the chamber but does not completely close the air vent due to the very small notch 47 formed at said end; but with the nipple inverted, as when in use, said valve seats against and closes the outer rounded end of said chamber, except when it is drawn away therefrom as will presently appear. After compression of the body 10 to expel the air therefrom, the outer reduced end of the nipple is inserted into the mouth-piece 19 in substantially the position shown in Figure 1. The body 10 is then released so that suction may start, whereupon liquid will begin to flow from the bottle into the body, with the valve 46 seated against the outer, or the then lower, end of the chamber 45, shutting off entry of air through the passage 44 into the bottle. As the level of the liquid in the bottle recedes, a partial vacuum begins to form above said liquid and when this partial vacuum becomes sufficient, it will lift the valve 46 against the then upper end of the chamber 45 and allow air to pass around the valve and through the notch 47 into the bottle, forming in the liquid therein a series of bubbles simulating those formed in a nursing bottle when an infant occasionally releases the nipple to allow air to enter the bottle. When sufficient air has entered the bottle to break the partial vacuum therein, the valve restores to its seat against the lower end of the chamber 45 and the entry of air is again shut off. In this manner, there is accomplished the alternate and intermittent flow of liquid from the bottle and entry of air thereinto to simulate the human function of an infant nursing from a bottle.

In Figure 7, the nipple body 48 is provided with an air vent 49 of graduated cross sectional areas and a central liquid passage 50 having a chamber 51 therein in which is movable the ball valve 52. When suction is applied to the nipple in its inverted position, the valve rests against the outer or lower seat of the chamber 51 and thus allows only a restricted or slow passage of liquid around the valve and through the small notch 53 in said seat.

What is claimed is:

1. In a doll, a compressible body, a head thereon having a mouth opening adapted to receive the nipple of a nursing bottle, means connecting said mouth opening with the interior of said body, in which connecting means a suction is created when said body expands from a compressed condition to draw liquid from said bottle into said body, the latter having an outlet for the egress of said liquid, and valve means responsive to the cessation of said suction to control the egress of liquid through said outlet.

2. In a doll, a compressible body, a head thereon having a mouth opening adapted to receive the nipple of a nursing bottle, a valve controlled connection between said mouth opening and the interior of said body in which connection a suction is created by expansion of said body from a compressed condition to draw liquid from said bottle into said body, an outlet in the wall of said body, and a valve in said outlet operated by said suction to close said outlet and responsive to the cessation of suction to open the outlet.

3. In a doll, a compressible body, a head mounted thereon and having a mouth opening, a neck piece in said body forming a liquid tight partition between the interior of said body and said head, a pipe extending from said mouth opening through said neck piece for directing the flow of liquid into said body, and a valve in said pipe controlling said flow.

4. In a doll, a compressible body, a head mounted thereon and having a mouth opening, a partition in said body at the neck portion thereof and snugly fitting the wall of said body, a second partition in said body spaced from the first named partition and forming a liquid compartment, and a pipe extending from said mouth opening and through said partitions for directing the flow of liquid into said compartment, the wall of said body having a liquid outlet communicating with said compartment.

5. In a doll, a compressible body having a liquid inlet, and further having a liquid outlet, and means to control the ingress of liquid into said body during expansion of said body, after compression, and valve means operable only after complete expansion of said body to permit the flow of liquid through said outlet.

6. In a doll, a body, means to direct a liquid into said body, an opening formed in said body, a valve structure disposed in said opening and providing an outlet, said structure including cooperating portions disposed on opposite sides of the wall of said body surrounding said opening, and a valve within said structure for closing said outlet when liquid flows into said body and for thereafter controlling the passage of said liquid from said body through said outlet.

7. A nipple for nursing bottles comprising a body portion having liquid and air passages therein, and a valve in one of said passages controlling the flow of liquid through said liquid passage, the other of said passages having a series of shoulders in the wall thereof of diameters successively decreasing in the direction of the flow of fluid through the passage.

8. In a doll, a body having a mouth opening and compressible to create a suction therein, a bottle, a nipple carried by said bottle for insertion into said opening and having liquid and air passages, and a valve in one of said passages controlling the flow of liquid from said bottle.

9. In combination, a doll body having a liquid compartment and provided with an opening, a valve structure in said opening including a body having a circumferential groove receiving the edge of said opening, said valve body having an outlet passage therethrough communicating with said compartment, and a valve in said passage controlling the flow of liquid from said compartment and the entry of air thereinto.

10. In combination, a doll body having a liquid compartment and provided with an opening, a valve structure in said opening including internally and externally screw-threaded members disposed on opposite sides of said body contiguous to said opening to clamp said body therebetween, said valve structure having an outlet passage therethrough communicating with said compartment and the members of said structure each having a valve seat, and a valve in said structure operable to engage one of said seats to fully close said outlet passage and to permit the flow of liquid from said compartment when engaged with the other of said seats.

11. A nipple for nursing bottles comprising a body portion having fluid passages for liquid and air therein, one of said passages having a series of shoulders in the wall thereof of diameters successively decreasing in the direction of the flow of liquid through the passage.

12. In a doll, a head having a mouth opening adapted to receive the nipple of a nuring bottle, a compressible member having an outlet, means connecting said compressible member with said mouth opening to convey liquid from said bottle into said member, and in which connecting means a suction is created when said compressible member expands from a compressed condition to draw said liquid from said bottle, and valve means, operable upon cessation of said suction to control the egress of liquid through said outlet.

13. In a doll, a head having a mouth opening adapted to receive the nipple of a nuring bottle, a compressible body member having an outlet, means connecting said member with said mouth opening to convey liquid from said bottle into said member, said member also forming a part of the body of the doll and having therein a liquid receiving and holding compartment remote from said mouth opening and having also a restricted liquid outlet opening in a wall thereof and in communication with said compartment but disconnected and removed from said connecting means.

14. In a doll, a compressible body, a head thereon having a mouth opening adapted to receive the nipple of a nursing bottle, means communicating between said mouth opening and the interior of said body, the lower part of said body being formed into a liquid receiving and holding compartment and having an automatic restricted fluid outlet in a wall thereof permitting relatively slow and retarded egress of liquid, the rear wall of said compartment being depressed and the lower part of said depression being below the surrounding wall so that it forms the lowest part of the said compartment when the said body is disposed horizontally on its back, the said restricted outlet being located in the said lower part of said depression.

15. In a doll, a hollow body member having appendages, the lower interior portion of said body member providing a chamber for the reception of liquid, said lower interior portion having means to control the discharge of liquid through the wall thereof, a head on said body member having a mouth, a conduit in said head establishing communication between said mouth and the interior of said lower interior portion, and means for introducing liquid to said lower interior portion through said conduit at a rate exceeding the discharge capacity of said control means.

MARIE WITTMANN.